United States Patent [19]
Youngdale

[11] 3,882,240
[45] May 6, 1975

[54] METHOD FOR PRODUCING INFERTILITY IN MALE RATS

[75] Inventor: Gilbert A. Youngdale, Portage, Mich.

[73] Assignee: The Upjohn Company, Kalamazoo, Mich.

[22] Filed: Mar. 30, 1973

[21] Appl. No.: 346,493

Related U.S. Application Data

[63] Continuation-in-part of Ser. No. 93,382, Nov. 27, 1970, abandoned.

[52] U.S. Cl. ............................................. 424/304
[51] Int. Cl. ............................................ Aoln 9/20
[58] Field of Search .................................. 424/304

[56] References Cited
OTHER PUBLICATIONS

Sakai et al., Chem. Abstracts, 1962, Vol. 57, pp. 13621a.
Kurtz et al., Chem. Abstracts, 1952, Vol. 47, pp. 2196g.

Primary Examiner—Jerome D. Goldberg
Assistant Examiner—Dale R. Ore
Attorney, Agent, or Firm—John J. Killinger; Roman Saliwanchik

[57] ABSTRACT

Compositions for oral administration to rats consisting essentially of edible orally-acceptable carriers containing an effective amount of a compound of the formula:

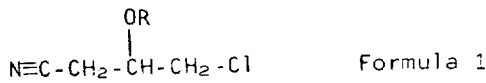

Formula 1 wherein R is a member selected from the group consisting of hydrogen and an acyl radical of a hydrocarbon carboxylic acid of 1 to 18 carbon atoms, inclusive. Methods for preventing impregnation of female rats by inducing sterility in the male population by producing to the males for their oral ingestion, ad lib., of the foregoing compositions. The edible orally acceptable carrier can be, for example, ordinary garbage or commercially available animal feeds, e.g., dog food.

3 Claims, No Drawings

METHOD FOR PRODUCING INFERTILITY IN MALE RATS

CROSS-REFERENCE TO RELATED APPLICATIONS

This application is a continuation-in-part of application Ser. No. 93,382, filed Nov. 27, 1970 now abandoned.

BRIEF SUMMARY OF THE INVENTION

This invention relates to pest control preparations and methods of use thereof. The preparations are compounded with edible orally acceptable carriers to prepare baits and the like. The preparations contain an effective amount of a compound of the Formula 1 for bringing about sterility in the male rats.

DETAILED DESCRIPTION OF THE INVENTION

The compounds of the Formula 1 are prepared by methods known in the art. For example, 4-chloro-3-hydroxy-butyroni-trile is prepared by reaction of hydrogen cyanide with epichlorohydrin, J. V. Hormann, Ber., 12, 23 (1879). The acyl derivatives of a hydrocarbon carboxylic acid of 1 to 18 carbon atoms, inclusive, are for example, acetyl, propionyl, butyryl, isobutyryl, valeryl, isovaleryl, caproyl, decanoyl, undecanoyl, lauroyl, formyl, hexadecanoyl, heptadecanoyl, stearoyl, acryloyl, and benzoyl and can be prepared by standard methods known to the art.

Compositions for controlled laboratory use contain from about 0.01 to about 0.5 gm. of the essential active ingredient per unit dose, but are not limited thereto, since within such range they include, for example, 0.05 gm., 0.1 gm., and 0.25 gm. Sterile liquid forms for injectable administration contain from about 1.0 to 85 percent of the essential active ingredient but are not limited thereto since they include within this range, for example, 25, 50 and 75 percent. Liquid oral dosage forms contain from about 5 to 85 of the essential active ingredient but are not limited thereto, since within this range are included, for example, 10, 20, 60, and 80 percent. These dosage forms provide, generally, a dosage range of essential active ingredient from about 0.01 to about 0.5 gm. per day. The daily oral and parenteral doses are approximately the same except for sustained parenteral dosage forms which contain from about 0.1 gm. to about 1.0 gm. of essential active ingredient per ml. and are given once a month intramuscularly. The usual oral and parenteral forms are to be administered once per day. Other ingredients, which are however not essential to the present invention, are for example, a progestational agent such as medroxy-progesterone or melengestrol acetate, given in the usual dosage regime for such active ingredient.

Mature virgin male rats are checked for ability to mate by placement with immature female rats primed with gonadotropic factor of pregnant mare's serum. Those males which mate are used for subcutaneous injection or oral administration of the novel pharmaceutical perparations. The essential active ingredient is prepared as a 30 mg./ml. l. dispersion in 0.25 percent aqueous methylcellulose in sterile vehicle. This pharmaceutical composition is administered to each of three mature mating males, a half ml. per day subcutaneously or orally for 8 days. These treated males are exposed to receptive mature females for mating and mating is checked by the presence of sperm with or without a plug in the vagina of the female. Approximately 10 days thereafter, the females are examined for the presence and number of implantation sites, and the ability of the pharmaceutical compositions to prevent impregnation by the mature male is shown by the absence of implantation sites at autopsy.

The following examples illustrate making and using the invention under controlled laboratory conditions but are not to be construed as limiting.

EXAMPLE 1

4-Chloro-3-hydroxy-butyronitrile was prepared as a 3% sterile dispersion in 0.25 percent aqueous methylcellulose. one half ml. was injected subcutaneously into each of three mating male rats for 8 days. Thereafter, the treated males were subjected to the aforesaid procedure to determine the ability of the preparation to prevent impregnation by the males, and the preparation was found to be effective.

EXAMPLE 2

3-Acetoxy-4-chloro-butyronitrile oil dispersion in the form of a pharmaceutical preparation, provided an oral pharmaceutical preparation effective in preventing implantation.

EXAMPLE 3

The 3-propionyloxy and 3-undecanoyloxy acylates of 4-chloro-3-hydroxy-butyronitrile (i.e., 4-chloro-3-propionylbutyronitrile and 4-chloro-3-undecanoylbutyronitrile) were likewise tested according to procedures given heretofore and found capable of preventing impregnation by the male.

EXAMPLE 4

An oral pharmaceutical preparation containing 1 percent of 4-chloro-3-hydroxy-butyronitrile in 0.25 percent aqueous methylcellulose was administered orally to mating mature male rats daily for seven weeks at a daily dose of 5 mg. per rat. This preparation induced inability in the male to impregnate receptive females by the first week and this infertility remained throughout the treatment.

Preferred embodiments of the present invention concept are baits for the oral ingestion by rats, i.e., a compound of the formula 1 mixed with an edible orally acceptable carrier, and methods of controlling rat populations by providing the active ingredient in amounts that are attractive to the animals in the sense that they are not repelled thereby, in association with a carrier of edible dietary constituents such as protein, fat, carbohydrate, minerals and vitamins.

The medicated ration must not repel the rodents although it does not necessarily have to attract in the sense of being absolutely preferred over other rations. Hence, the medicated ration retains the natural flavor of the dietary constituents after the essential active ingredient is incorporated therein. Such incorporation provides a final mixture of blend throughout which the active ingredient is uniformly distributed. Such active ingredient can be added to the ration by mixing both as solids or as liquids, by addition to a solid ration of a solution or suspension in water or ethanol; by adding the active ingredient in a liquid which is then removed to leave a dry solid mixture, for example, a solution or suspension in water or ethanol; by adding the active ingredient in the form of coated particles or pellets, coated, for example, by coacervation with gelatin, or by coating with an alcohol of a water-soluble type of ethyl cellulose. The final ration containing the coated particles or pellets is the preferred form because of its tendency to better mask any undersirable taste of the essential active ingredient. The rations contain the essential active ingredient in a concentration sufficient to cause lesions in the excurrent duct (epididymal lesions) and permanent infertility in otherwise fertile male animals, especially rats, when they ingest the compositions in their usual manner of providing for their metabolic needs. Illustratively, most mature male rats that ingest an amount of the ration providing at least about 30 mg. per kilogram of rat body weight become irreversibly infertile as shown by epididymal lesions and by sterile mating with fertile females. As will be apparent, rats eating ad libitum will consume different amounts of the active ingredient-containing rations. Hence, to provide about 100 mg. per kilogram in a rat eating a smaller amount of the effective ration, a more concentrated ration must be provided than for a rat consuming a larger amount of the same ration. In the latter case, a less concentrated ration is operable. For example, in rats weighing about 200 to 250 gm. and consuming about 10 to 25 gm. of ration at one feeding, the ration may contain 0.1 percent by weight of the active ingredient. Thereby, the 250 gm. rat consuming 10 gm. of the treated edible preparation ingests 10 mg. of the active ingredient equivalent to about 40 mg. per kilo. With this same ration containing 0.1 percent active ingredient, a 200 gm. rat eating 25 gm. at one feeding ingests 25 mg. of the active ingredient, equivalent to about 125 mg. per kilo. Such variations will occur due to the eating habits of the rats. Hence, various embodiments of the rodent-control preparations are within the inventive concept provided they contain an effective amount of the essential active ingredient to cause the males to acquire the epididymal lesions of infertility. In its simplest form the composition can be prepared by merely mixing a compound of the formula 1 with garbage before or at the time of dumping. Another method such as for use in the basements of buildings is to mix a compound of the formula 1 with commerical animal feeds, e.g., dog food.

The aforesaid embodiments of this invention concept provide a method of controlling fertility of male rodents, especially rats, which consists essentially of providing in locales available to and frequented by said male rodents rations supplying an effective amount of a compound of the Formual 1. Preferably, the rations supply to the recipient at least about 30 mg./kg. of body weight thereof. At this level most rats acquire irreversible infertility and a reduction in rat population ensues in time. Expressed as percentage by weight of the edible composition, the active ingredient amounts to from about 0.05 to about 0.5 percent, such range being not limited thereto for it includes within the range of other percentages such as 0.1, 0.2, 0.3, and 0.4 percent. A more concentrated perparation, say up to about 1 percent or even 5percent, is satisfactory provided it is, upon use, diluted with the aforesaid edible dietary constituents to provide operative amounts of the essential active ingredient without wasting active material. These embodiments of the inventive concept are made available to the animals, especially rats, for control of the population thereof by placing the preparation in and about the locales available to and frequented by the rodents.

EXAMPLE 5

The following composition can be prepared for use in homes or apartment buildings.

| | |
|---|---|
| Canned dog food | 1 lb. |
| 4-chloro-3-hydroxy-butyronitrile | 2.5 gm. |

The 4-chloro-3-hydroxy-butyronitrile is stirred into the dog food and placed in the basement or other areas of known rodent runs.

EXAMPLE 6

Treatment of garbage to be placed in open dumps, 4-chloro-3-hydroxy-butyronitrile is dissolved in water and sprayed on raw gargabe at the rate of 1.1 lb. of 4-chloro-3-hydroxy butyronitrile per ton of garbage, prior to dumping in open dumps.

I claim:

1. A method for producing epididymal lesions and infertility in fertile male rats which comprises the oral administration to a fertile male rat of an effective amount for producing epididymal lesions an infertility of a compound of the formula:

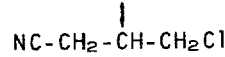

Wherein R is a member selected from the group consisting of hydrogen and acyl of hydrocarbon carboxylic acid of from 1 to 18 carbon atoms, inclusive, in association with an edible orally acceptable carrier.

2. The method of claim 1 wherein the effective amount is at least about 30 mg./kg. of body weight of said male rats.

3. The method of claim 1 wherein the compound is 4-chloro-3-hydroxy-butyronitrile.